US012799312B2

(12) United States Patent
Sun et al.

(10) Patent No.: US 12,799,312 B2
(45) Date of Patent: Nov. 17, 2026

(54) POLYPROPYLENE PEROXIDE MASTERBATCH

(71) Applicant: FINA TECHNOLOGY, INC., Houston, TX (US)

(72) Inventors: Likuo Sun, Sugar Land, TX (US); John Bieser, Houston, TX (US); LuAnn Kelly, Friendswood, TX (US)

(73) Assignee: FINA TECHNOLOGY, INC., Houston, TX (US)

( * ) Notice: Subject to any disclaimer, the term of this patent is extended or adjusted under 35 U.S.C. 154(b) by 574 days.

(21) Appl. No.: 18/374,226

(22) Filed: Sep. 28, 2023

(65) Prior Publication Data

US 2024/0110048 A1 Apr. 4, 2024

Related U.S. Application Data

(60) Provisional application No. 63/412,105, filed on Sep. 30, 2022.

(51) Int. Cl.

| | |
|---|---|
| ***C08L 23/12*** | (2006.01) |
| ***C08J 3/00*** | (2006.01) |
| ***D01D 5/08*** | (2006.01) |
| ***D01F 1/02*** | (2006.01) |
| ***D01F 6/06*** | (2006.01) |

(52) U.S. Cl.

CPC ............... *C08L 23/12* (2013.01); *C08J 3/005* (2013.01); *D01D 5/08* (2013.01); *D01F 1/02* (2013.01); *D01F 6/06* (2013.01); *C08J 2323/12* (2013.01); *C08J 2423/12* (2013.01); *C08L 2205/025* (2013.01); *C08L 2205/16* (2013.01); *D10B 2321/022* (2013.01); *D10B 2401/063* (2013.01)

(58) Field of Classification Search

CPC ........................... C08L 2205/025; C08L 23/12

See application file for complete search history.

(56) References Cited

U.S. PATENT DOCUMENTS

| | | | | |
|---|---|---|---|---|
| 6,653,254 | B1 | 11/2003 | Shamshoum et al. | |
| 7,056,991 | B2 | 6/2006 | Tharappel et al. | |
| 8,071,687 | B2 | 12/2011 | Jiang et al. | |
| 8,088,867 | B2 | 1/2012 | Jiang et al. | |
| 8,957,159 | B2 | 2/2015 | Jiang et al. | |
| 10,100,183 | B2 | 10/2018 | Macdonald et al. | |
| 11,390,731 | B2 | 7/2022 | Allen, Jr. et al. | |
| 2020/0262946 | A1 * | 8/2020 | McLeod | C08K 5/17 |

FOREIGN PATENT DOCUMENTS

| | | | |
|---|---|---|---|
| CN | 104250883 | | 12/2014 |
| CN | 106751352 | * | 12/2016 |
| CN | 110248995 | | 9/2019 |
| CN | 111116791 | | 5/2020 |
| CN | 113789580 | | 12/2021 |
| JP | 4210448 | * | 1/2009 |

OTHER PUBLICATIONS

English language translation CN 10675352, Dec. 26, 2016.*

English language translation JP 4210448, Jan. 21, 2009.*

PCT International Search Report and Written opinion issued in Corresponding PCT Application No. PCT/US2023/075324, dated Jan. 24, 2024.

TotalEnergies, “Polypropylene 3860X,” TotalEnergies Petrochemicals & Refining USA, Inc. Polymers Americas, Technical Data Sheet, Sep. 2021.

TotalEnergies, “Lumicene Polypropylene M3661,” TotalEnergies Petrochemicals & Refining USA, Inc. Polymers Americas, Technical Data Sheet, Sep. 2021.

TotalEnergies, “Lumicene Polypropylene M3766,” TotalEnergies Petrochemicals & Refining USA, Inc. Polymers Americas, Technical Data Sheet, May 2022.

TotalEnergies, “Polypropylene 3825,” TotalEnergies Petrochemicals & Refining USA, Inc. Polymers Americas, Technical Data Sheet, Sep. 2021.

TotalEnergies, “Polypropylene 3462,” TotalEnergies Petrochemicals & Refining USA, Inc. Polymers Americas, Technical Data Sheet, Sep. 2021.

TotalEnergies, “Polypropylene 3962,” TotalEnergies Petrochemicals & Refining USA, Inc. Polymers Americas, Technical Data Sheet, Sep. 2021.

* cited by examiner

*Primary Examiner* — Margaret G Moore

(74) *Attorney, Agent, or Firm* — NORTON ROSE FULBRIGHT US LLP

(57) ABSTRACT

Disclosed is a polymeric blend and a method of making and using the same. The polymeric blend includes 75 wt. % to 99 wt. % of a first polypropylene composition comprising polypropylene and having a melt flow rate (MFR) of A g/10 min as measured by ASTM D1238 (230 °C/2.16 kg), wherein the first polypropylene composition has been previously extruded prior to forming the blend, and 1 wt. % to 25 wt. % of a second polypropylene composition comprising polypropylene and an organic peroxide and having a MFR of B g/10 min as measured by ASTM D1238 (230 °C/2.16 kg), wherein the second polypropylene composition has been previously extruded prior to forming the blend, wherein the polymeric blend has a MFR of C g/10 min as measured by ASTM D1238 (230 °C/2.16 kg), and wherein C is greater than A.

29 Claims, 4 Drawing Sheets

POLYPROPYLENE PEROXIDE MASTERBATCH

CROSS REFERENCE TO RELATED APPLICATIONS

The present application claims the benefit of U.S. Provisional Application 63/412,105 filed Sep. 30, 2022, which is incorporated herein by reference in its entirety.

BACKGROUND OF THE INVENTION

A. Field of the Invention

The invention generally concerns polyolefin blends (e.g., polypropylene blends). In some aspects, the melt flow rate of a previously extruded polyolefin composition (e.g., a first polypropylene composition) can be modified (e.g., lowered) by blending it with another previously extruded polyolefin composition (e.g., a second polypropylene composition) that includes an organic peroxide. In some aspects, the second previously extruded polyolefin composition with the organic peroxide can be used as an organic peroxide master batch melt flow rate modifier for the first polyolefin composition.

B. Description of Related Art

Polyolefins such as propylene polymers are widely used in today's society (e.g., agriculture, construction, fibers, spun-bound non-woven materials, healthcare, packaging, and other industries.). Typical propylene polymers include polypropylene homopolymers, random and heterophasic polypropylene copolymers, impact copolymers, or combinations thereof.

Polypropylene is typically manufactured in large scale reactors. Depending upon their intended application, a given polypropylene may be manufactured in different grades depending on the desired processing conditions. By way of example, polypropylene with a relatively low melt flow rate typically has a high average molecular weight and a broad molecular weight distribution. Such low melt flow rate polypropylenes can be difficult to work with when manufacturing fibers or when using injection molding processes. To overcome these processing limitations, polypropylene can be manufactured with a relatively high melt flow rate, with such polymers having a comparatively lower average molecular weight and a narrower molecular weight distribution when compared with low melt flow rate polymers.

Oftentimes, peroxides (e.g., peroxide master batches) are used as additives in modifying the melt flow rate of polypropylene compositions. Peroxides can act as visbreaking agents and can reduce the viscosity; thus increasing the melt flow rate of a given polypropylene composition or blend thereof. This typically occurs through polymer chain scission. In particular, peroxides can act as a free radical initiator, which can result in chain scission of the polypropylene. Peroxides used as visbreaking agents can come in both liquid and solid forms, with both forms typically being added during the extrusion process to modify the melt flow rate of a given polymer composition.

The processing conditions and/or chemical reactions during the extrusion process have generally been thought to decompose the peroxides to such an extent that they do not remain active as visbreaking agents and/or are not reuseable. This is problematic, as peroxides can be costly. Still further, it can be difficult to store and handle peroxides, and especially liquid-based peroxides. Even further, the continuing need for peroxide-based chemicals, whether in liquid or solid form, leads to the presence of more chemicals in today's society.

SUMMARY OF THE INVENTION

A discovery has been made that provides a solution to at least one or more of the aforementioned problems associated with modifying the melt flow rate of an already extruded polypropylene composition (e.g., first extruded polypropylene composition). In one aspect, it was discovered that a previously extruded polypropylene composition having a peroxide (e.g., second extruded polypropylene composition) can itself be used as melt flow rate modifier for the first polypropylene composition. In particular, and in one aspect, the second extruded polypropylene composition having the peroxide can be used as a peroxide master batch to reduce the melt flow rate of the first extruded polypropylene composition. Without wishing to be bound by theory, it is believed that at least a portion of the peroxide from second extruded polypropylene composition remains active (e.g., capable of acting as a visbreaking agent) despite the fact that the second composition has been previously subjected to typical extruding conditions. This can be advantageous in at least one or more of the following ways: (1) pellet to pellet polypropylene blends can be used without having to use additional peroxide master batch formulations; (2) the peroxide in the second extruded polypropylene composition, which may have previously been used to modify the melt flow rate of the second composition, can be re-used/recycled as a melt flow rate modifier for the first composition—use of the peroxide more than once as a melt flow rate modifier reduces the need to purchase or make additional peroxides, which can be beneficial from a cost perspective and/or from a societal perspective by limiting the need for producing additional peroxides; and/or (3) the second extruded polypropylene composition can safely be used as a peroxide master batch for the first composition given the presence of extruded polypropylene (e.g., while the melt flow rate of the first composition may be modified as desired, the other properties of the first composition can be retained due to the similarities between the first and second previously extruded compositions).

In one aspect of the present invention, there is disclosed a polymeric blend comprising 75 wt. % to 99 wt. % of a first polypropylene composition comprising polypropylene. The first composition may have a melt flow rate (MFR) of A g/10 min as measured by ASTM D1238 (230 °C/2.16 kg). In some aspects, the first polypropylene composition has been previously extruded prior to forming the blend. In other aspects, the first polypropylene composition has not been previously extruded prior to forming the blend. In one aspect, the first polypropylene composition includes an organic peroxide compound prior to forming the blend. In another aspect, the first polypropylene composition does not include an organic peroxide compound prior to forming the blend. The blend can also include 1 wt. % to 25 wt. % of a second polypropylene composition that includes polypropylene and an organic peroxide. The second composition can have a MFR of B g/10 min as measured by ASTM D1238 (230 °C/2.16 kg). In some aspects, the second polypropylene composition has been previously extruded prior to forming the blend. The blend of the first and second compositions can have a MFR value C g/10 min as measured by ASTM D1238 (230 °C/2.16 kg). In certain aspects, C is greater than A. In some aspects, the polymeric blend does not include any other organic peroxide other than the organic peroxide present in the second polypropylene composition. The second polypropylene composition can act as a peroxide master batch to have C be greater than A. In one preferred aspect, the second polypropylene composition can have any one of, any combination of, or all of: a specific gravity of density of 0.89 g/cc to 0.92 g/cc, preferably about 0.905 g/cc, as measured in accordance with ASTM D1505; a melting point of 145 °C to 175 °C, preferably about 165 °C, as measured using differential scanning calorimetry (DSC); and/or a MFR value of 500 to 2000 g/10 min as measured by ASTM D1238 (230 °C/2.16 kg), preferably 1250 to 1350 g/10 min, or more preferably about 1300 g/10 min. The second polypropylene composition can also include other additives (e.g., antioxidants, neutralizers, etc.) that are typically used in polypropylene resins—the reason for this is premised on the discovery that a previously extruded polypropylene composition that included a peroxide master batch (e.g., a liquid master batch) was capable of itself acting as a peroxide master batch. In this sense, the second polymeric composition can be an extruded and solid/non-liquid peroxide master batch capable of modifying (e.g., increasing) the MFR of another polymeric composition. Still further, both of the first and second polypropylene compositions can be made from a variety of different catalysts (e.g., Zeigler-Natta or Metallocene catalysts, with Zeigler-Natta catalysts being preferred). In some aspects, the polypropylene in the first and/or second polypropylene composition can be a polypropylene homopolymer, a random copolymer, or an impact copolymer, or any combination thereof. In some aspects, the second polypropylene composition can include at least 99 wt. % of the polypropylene and less than 1 wt. % of the organic peroxide, based on the total weight of the second polypropylene composition. In some particular aspects, the organic peroxide is 3,6,9-triethyl-3,6,9-trimethyl-1,4,7-triperoxonane. However, it is contemplated that other peroxides can be used such as those used with polypropylene compositions (e.g., 2,5-Dim ethyl-2,5-di(tert-butylperoxy) hexane, 3,6,9-triethyl-3,6,9-trimethyl-1,4,7-triperoxonane, or (1,2,4,5,7,8-hexoxonane, 3,6,9-trimethyl-3,6,9-tris(ethyl and propyl) derivatives, or any combination thereof. In certain aspects, A in the first composition can be 0.5 g/10 min to 150 g/10 min or any range or number therein (e.g., 1, 2, 3, 4, 5, 6, 7, 8, 9, 10, 15, 20, 25, 30, 35, 40, 45, 50, 55, 60, 65, 70, 75, 80, 85, 90, 95, 100, 105, 110, 115, 120, 125, 130, 135, 140, 145, 146, 147, 148, 149, or more). In some aspects, the first polymeric composition can include at least 80 wt. % polypropylene, preferably at least 90 to 95 wt. % polypropylene, based on the total weight of the first composition. In some aspects, the polypropylene in the first polypropylene composition can be a polypropylene homopolymer.

In one particular aspect, the polymeric blend of the present invention can include 94 wt. % to 96 wt. % of the first polypropylene composition and 4 wt. % to 6 wt. % of the second polypropylene composition, based on the total weight of the blend, and wherein the ratio of C:A is 2 to 3. In certain aspects, A can be 3 to 5 g/10 min, and C can be 8 to 12 g/10 min. In another aspect, the polymeric blend can include 89 wt. % to 91 wt. % of the first polypropylene composition and 9 wt. % to 11 wt. % of the second polypropylene composition, based on the total weight of the blend, and wherein the ratio of C to A is 4 to 5. In certain aspects, A can be 3 to 5 g/10 min and C can be 16 to 20 g/10 min. In one aspect, the first polypropylene composition can include any one of, any combination of, or all of: a specific gravity of density of 0.89 g/cc to 0.92 g/cc, preferably about 0.905 g/cc, as measured in accordance with ASTM D1505; a melting point of 160 °C to 170 °C, preferably about 165 °C, as measured using differential scanning calorimetry (DSC); and a MFR of 3 to 5 g/10 min, preferably about 4.1 g/10 min, as measured by ASTM D1238 (230 °C/2.16 kg).

In another aspect, the polymeric blend of the present invention can include any one of, any combination of, or all of: a specific gravity of density of 0.89 g/cc to 0.92 g/cc, preferably about 0.905 g/cc, as measured in accordance with ASTM D1505; a melting point of 145 °C to 160 °C, preferably about 152 °C, as measured using differential scanning calorimetry (DSC); and a MFR of 10 to 20 g/10 min, preferably about 14 g/10 min, as measured as measured by ASTM D1238 (230 °C/2.16 kg).

In yet another aspect, the first polypropylene composition can include any one of, any combination of, or all of: a specific gravity of density of 0.89 g/cc to 0.92 g/cc, preferably about 0.90 g/cc, as measured in accordance with ASTM D1505; a melting point of 145 °C to 160 °C, preferably about 151 °C, as measured using differential scanning calorimetry (DSC); and a MFR of 20 to 30 g/10 min, preferably about 24.7 g/10 min, as measured by ASTM D1238 (230 °C/2.16 kg).

In still another aspect, the first polypropylene composition can include any one of, any combination of, or all of: a specific gravity of density of 0.89 g/cc to 0.92 g/cc, preferably about 0.905 g/cc, as measured in accordance with ASTM D1505; a melting point of 160 °C to 170 °C, preferably about 165 °C, as measured using differential scanning calorimetry (DSC); and a MFR of 25 to 35 g/10 min, preferably about 30 g/10 min, as measured by ASTM D1238 (230 °C/2.16 kg).

In another aspect, the first polypropylene composition can include any one of, any combination of, or all of: a specific gravity of density of 0.89 g/cc to 0.92 g/cc, preferably about 0.905 g/cc, as measured in accordance with ASTM D1505; a melting point of 160 °C to 170 °C, preferably about 165 °C, as measured using differential scanning calorimetry (DSC); and a MFR of 90 to 110 g/10 min, preferably about 100 g/10 min, as measured by ASTM D1238 (230 °C/2.16 kg).

In some aspects, the polymeric blend is in the form of or can be formed into fibers and/or non-woven materials. In some instances, a plurality of the fibers are included in a fully oriented yarn (FOY), wherein the FOY, at a 2:1 draw ratio, has a denier of 300 and 400, a maximum tenacity of 2 to 3, and a maximum elongation of 150 to 250. In some instances, a plurality of the fibers are comprised in a partially oriented yarn (POY), wherein the POY, at a spinning rate of 4000 m/min, has a denier of 100 to 150, a maximum tenacity of 1.85 to 2.50, and a maximum elongation of 150 to 200.

Also disclosed in the context of the present invention is an article of manufacture that includes the polymeric blend of the present invention. Non-limiting examples of articles of manufacture include extruded, blow-molded, injection-molded, rotational molded, compression molded, 3-D printed, or thermoformed compositions or fibers.

Also disclosed is a method for making a fiber comprising any one of the polymeric blends of the present invention. The method can include blending the second polypropylene composition with the first polypropylene composition to form the polymeric blend; and forming a fiber from the polymeric blend. In some aspects, forming the fiber can include melting the polymeric blend at a melt temperature of 250 °C or below to form a melted composition, extruding the melted composition through a spinneret to form an extruded fiber filament, and drawing the extruded fiber filament. In certain aspects, the melted composition is extruded through the spinneret at a speed of 1500 meter/min to 4500 meter/min. In certain aspects, the draw ratio of the drawing process is 1.5:1 to 4.5:1.

In another aspect of the present invention there is disclosed a method for increasing melt flow rate (MFR) of a first polypropylene composition comprising a polypropylene. The method can include blending the first polypropylene polymeric composition with a second polypropylene composition that includes the polypropylene and an organic peroxide to form a polymeric blend. In such a polymeric blend, the second polypropylene composition has been previously extruded prior to forming the blend, and the polymeric blend has a MFR that is greater than the first polypropylene composition. In certain aspects, the polymeric blend does not include any other organic peroxide other than the organic peroxide present in the second polypropylene composition. In some instances, the second polypropylene composition comprises a specific gravity of density of 0.89 g/cc to 0.92 g/cc, preferably about 0.905 g/cc, as measured in accordance with ASTM D1505, a melting point of 145 °C to 170 °C, preferably about 165 °C, as measured using differential scanning calorimetry (DSC), and a MFR of 500 to 2000 g/10 min, preferably 1250 to 1350 g/10 min, or even more preferably about 1300 g/10 min as measured by ASTM D1238 (230 °C/2.16 kg). In some aspects, the polypropylene in the second polypropylene composition is a polypropylene homopolymer.

Also disclosed in the context of the present invention are aspects 1 to 31. Aspect 1 is a polymeric blend comprising: 75 wt. % to 99 wt. % of a first polypropylene composition comprising polypropylene and having a melt flow rate (MFR) of A g/10 min as measured by ASTM D1238 (230 °C/2.16 kg), wherein the first polypropylene composition has been previously extruded prior to forming the blend; and 1 wt. % to 25 wt. % of a second polypropylene composition comprising polypropylene and an organic peroxide and having a MFR of B g/10 min as measured by ASTM D1238 (230 °C/2.16 kg), wherein the second polypropylene composition has been previously extruded prior to forming the blend, wherein the polymeric blend has a MFR of C g/10 min as measured by ASTM D1238 (230 °C/2.16 kg), and wherein C is greater than A. Aspect 2 is the polymeric blend of aspect 1, wherein the polymeric blend does not include any other organic peroxide other than the organic peroxide present in the second polypropylene composition. Aspect 3 is the polymeric blend of any one of aspects 1 to 2, wherein the second polypropylene composition comprises: a specific gravity of density of 0.89 g/cc to 0.92 g/cc, preferably about 0.905 g/cc, as measured in accordance with ASTM D1505; a melting point of 145 °C to 175 °C, preferably about 165 °C, as measured using differential scanning calorimetry (DSC); and a MFR B of 500 to 2000 g/10 min as measured by ASTM D1238 (230 °C/2.16 kg), preferably 1250 to 1350 g/10 min, or more preferably about 1300 g/10 min. Aspect 4 is the polymeric blend of any one of aspects 1 to 3, wherein the polypropylene in the second polypropylene composition is a polypropylene homopolymer, random copolymer, or an impact copolymer, or any combination thereof. Aspect 5 is the polymeric blend of any one of aspects 1 to 4, wherein the second polypropylene composition comprises at least 99 wt. % of the polypropylene and less than 1 wt. % of the organic peroxide, based on the total weight of the second polypropylene composition. Aspect 6 is the polymeric blend of any one of aspects 1 to 5, wherein the organic peroxide is 3,6,9-triethyl-3,6,9-trimethyl-1,4,7-triperoxonane. Aspect 7 is the polymeric blend of any one of aspects 1 to 6, wherein MFR A is 0.5 g/10 min to 150 g/10 min. Aspect 8 is the polymeric blend of any one of aspects 1 to 7, wherein the first polymeric composition comprises at least 80 wt. % polypropylene, preferably at least 90 to 95 wt. % polypropylene, based on the total weight of the first composition. Aspect 9 is the polymeric blend of any one of aspects 1 to 8, wherein the polypropylene in the first polypropylene composition is a polypropylene homopolymer. Aspect 10 is the polymeric blend of any one of aspects 1 to 9, wherein the blend comprises 94 wt. % to 96 wt. % of the first polypropylene composition and 4 wt. % to 6 wt. % of the second polypropylene composition, based on the total weight of the blend, and wherein the MFR ratio of C:A is 2 to 3. Aspect 11 is the polymeric blend of aspect 10, wherein A is 3 to 5 g/10 min and C is 8 to 12 g/10 min. Aspect 12 is the polymeric blend of any one of aspects 1 to 9, wherein the blend comprises 89 wt. % to 91 wt. % of the first polypropylene composition and 9 wt. % to 11 wt. % of the second polypropylene composition, based on the total weight of the blend, and wherein the MFR ratio of C:A is 4 to 5. Aspect 13 is the polymeric blend of aspect 12, wherein A is 3 to 5 g/10 min and C is 16 to 20 g/10 min. Aspect 14 is the polymeric blend of any one of aspects 9 to 13, wherein the first polypropylene composition comprises: a specific gravity of density of 0.89 g/cc to 0.92 g/cc, preferably about 0.905 g/cc, as measured in accordance with ASTM D1505; a melting point of 160 °C to 170 °C, preferably about 165 °C, as measured using differential scanning calorimetry (DSC); and a MFR A of 3 to 5 g/10 min, preferably about 4.1 g/10 min, as measured by ASTM D1238 (230 °C/2.16 kg). Aspect 15 is the polymeric blend of any one of aspects 1 to 9, wherein the first polypropylene composition comprises: a specific gravity of density of 0.89 g/cc to 0.92 g/cc, preferably about 0.905 g/cc, as measured in accordance with ASTM D1505; a melting point of 145 °C to 160 °C, preferably about 152 °C, as measured using differential scanning calorimetry (DSC); and a MFR A of 10 to 20 g/10 min, preferably about 14 g/10 min, as measured as measured by ASTM D1238 (230 °C/2.16 kg). Aspect 16 is the polymeric blend of any one of aspects 1 to 9, wherein the first polypropylene composition comprises: a specific gravity of density of 0.89 g/cc to 0.92 g/cc, preferably about 0.90 g/cc, as measured in accordance with ASTM D1505; a melting point of 145 °C to 160 °C, preferably about 151 °C, as measured using differential scanning calorimetry (DSC); and a MFR A of 20 to 30 g/10 min, preferably about 24.7 g/10 min, as measured by ASTM D1238 (230 °C/2.16 kg). Aspect 17 is the polymeric blend of any one of aspects 1 to 9, wherein the first polypropylene composition comprises: a specific gravity of density of 0.89 g/cc to 0.92 g/cc, preferably about 0.905 g/cc, as measured in accordance with ASTM D1505; a melting point of 160 °C to 170 °C, preferably about 165 °C, as measured using differential scanning calorimetry (DSC); and a MFR A of 25 to 35 g/10 min, preferably about 30 g/10 min, as measured by ASTM D1238 (230 °C/2.16 kg). Aspect 18 is the polymeric blend of any one of aspects 1 to 9, wherein the first polypropylene composition comprises: a specific gravity of density of 0.89 g/cc to 0.92 g/cc, preferably about 0.905 g/cc, as measured in accordance with ASTM D1505; a melting point of 160 °C to 170 °C, preferably about 165 °C, as measured using differential scanning calorimetry (DSC); and a MFR A of 90 to 110 g/10 min, preferably about 100 g/10 min, as measured by ASTM D1238 (230 °C/2.16 kg). Aspect 19 is the polymeric blend of any one of aspects 1 to 18, wherein the blend is in the form of a fiber. Aspect 20 is the polymeric blend of aspect 19, wherein a plurality of the fibers are comprised in a fully oriented yarn (FOY), wherein the FOY, at a 2:1 draw ratio, has a denier of 300 and 400, a maximum tenacity of 2 to 3, and a maximum elongation of 150 to 250. Aspect 21 is the polymeric blend of aspect 19, wherein a plurality of the fibers are comprised in a partially oriented yarn (POY), wherein the POY, at a spinning rate of 4000 m/min, has a denier of 100 to 150, a maximum tenacity of 1.85 to 2.50, and a maximum elongation of 150 to 200.

Aspect 22 is an article of manufacture comprising the polymeric blend of any one of aspects 1 to 21. Aspect 23 is the article of manufacture of aspect 22, wherein the article of manufacture is an extruded, blow-molded, injection-molded, rotational molded, compression molded, 3-D printed, or thermoformed composition.

Aspect 24 is a method for making a fiber comprising any one of the polymeric blends of aspects 1 to 21, the method comprising: blending the second polypropylene composition with the first polypropylene composition to form the polymeric blend; and forming a fiber from the polymeric blend. Aspect 25 is the method of aspect 24, wherein forming the fiber comprises: melting the polymeric blend at a melt temperature of 250 °C or below to form a melted composition; extruding the melted composition through a spinneret to form an extruded fiber filament; and drawing the extruded fiber filament. Aspect 26 is the method of aspect 25, wherein the melted composition is extruded through the spinneret at a speed of 1500 meter/min to 4500 meter/min. Aspect 27 is the method of aspect 25 or 26, wherein the draw ratio of the drawing process is 1.5:1 to 4.5:1.

Aspect 28 is a method for increasing melt flow rate (MFR) of a first polypropylene composition comprising a polypropylene, the method comprising: blending the first polypropylene polymeric composition with a second polypropylene composition comprising polypropylene and an organic peroxide to form a polymeric blend, wherein the second polypropylene composition has been previously extruded prior to forming the blend, wherein the polymeric blend has a MFR that is greater than the first polypropylene composition. Aspect 29 is the method of aspect 28, wherein the polymeric blend does not include any other organic peroxide other than the organic peroxide present in the second polypropylene composition. Aspect 30 is the method of any one of aspects 28 to 29, wherein the second polypropylene composition comprises: a specific gravity of density of 0.89 g/cc to 0.92 g/cc, preferably about 0.905 g/cc, as measured in accordance with ASTM D1505; a melting point of 145 °C to 170 °C, preferably about 165 °C, as measured using differential scanning calorimetry (DSC); and a MFR of 500 to 2000 g/10 min, preferably 1250 to 1350 g/10 min, or even more preferably about 1300 g/10 min as measured by ASTM D1238 (230 °C/2.16 kg). Aspect 31 is the method of any one of aspects 28 to 30, wherein the polypropylene in the second polypropylene composition is a polypropylene homopolymer.

Other aspects or embodiments of the invention are discussed throughout this application. Any aspect or embodiment discussed with respect to one aspect of the invention applies to other aspects or embodiments of the invention as well and vice versa. Each aspect or embodiment described herein is understood to be aspects or embodiments of the invention that are applicable to other aspects of the invention. It is contemplated that any aspect or embodiment discussed herein can be combined with other aspects or embodiments discussed herein and/or implemented with respect to any method or composition of the invention, and vice versa. Furthermore, compositions and systems of the invention can be used to achieve methods of the invention.

The following includes definitions of various terms and phrases used throughout this specification.

The terms "about" or "approximately" are defined as being close to as understood by one of ordinary skill in the art. In one non-limiting embodiment, the terms are defined to be within 10%, alternatively within 5%, alternatively within 1%, and alternatively within 0.5%.

The terms "wt. %," "vol. %," or "mol. %" refer to a weight percentage of a component, a volume percentage of a component, or molar percentage of a component, respectively, based on the total weight, the total volume of material, or total moles, that includes the component. In a non-limiting example, 10 grams of component in 100 grams of the material is 10 wt. % of component. The terms "ppm" refer to parts per million by weight of a component, based on the total weight, that includes the component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification include any measurable decrease or complete inhibition to achieve a desired result.

The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The phrase "and/or" can include "and" or "or." To illustrate, X, Y, and/or Z can include: X alone, Y alone, Z alone, a combination of X and Y, a combination of X and Z, a combination of Y and Z, or a combination of X, Y, and Z.

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The process and systems of the present invention can "comprise," "consist essentially of," or "consist of" particular ingredients, components, compositions, steps, etc., disclosed throughout the specification. With respect to the transitional phrase "consisting essentially of," in one non-limiting aspect, a basic and novel characteristic of the compositions and processes of the present invention include the use of a second previously extruded polymer (e.g., polypropylene) composition having an organic peroxide as a master batch melt flow rate modifier for a first polymer (e.g., polypropylene) composition. The second previously extruded polymer composition can be capable of visbreaking the polymer in the first composition thereby reducing the average molecular weight of the polymer and increasing the melt flow rate of the first polymer composition.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings.

DETAILED DESCRIPTION OF THE INVENTION

Figure 1:
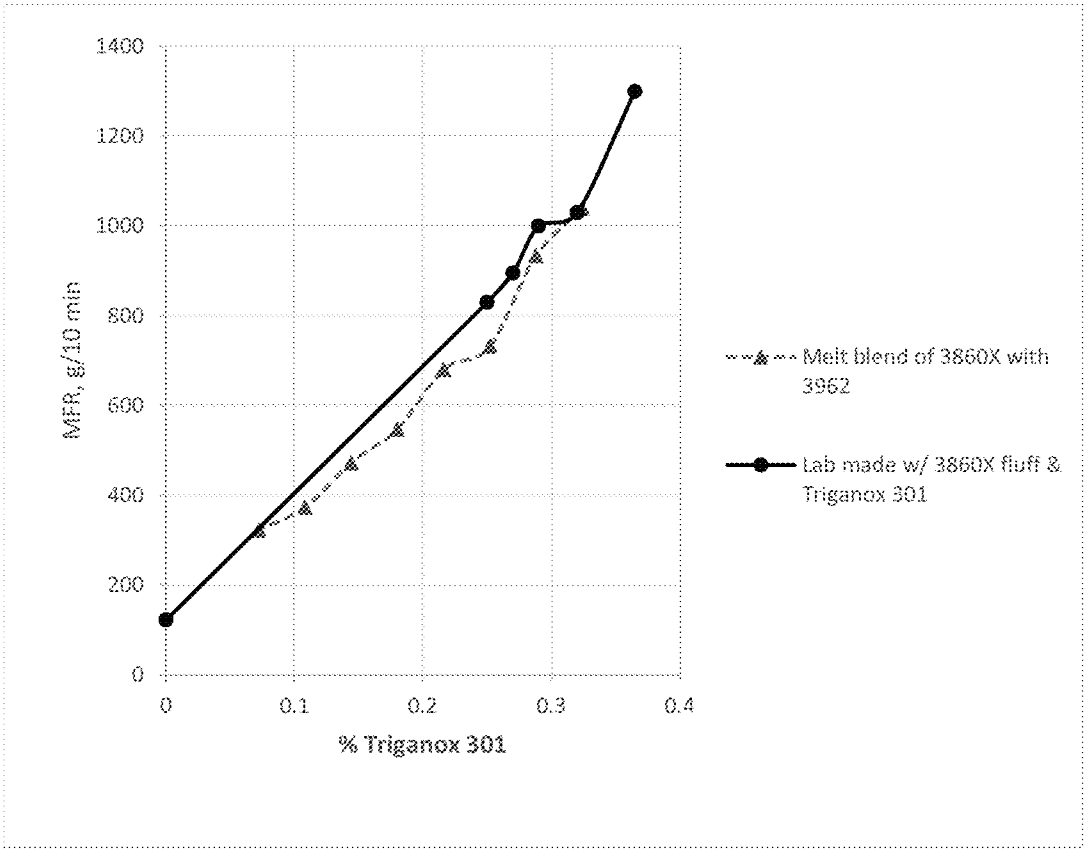
FIG. 1 is a graphical representation of an embodiment to prepare the second polypropylene composition of the present invention.

One aspect of the present invention is based on a discovery that a previously extruded polymeric (e.g., polypropylene) composition (second polymeric composition) that included an organic peroxide master batch melt flow rate modifier can itself be used as a master batch melt flow rate modifier for another polymeric (e.g., polypropylene) composition (first polymeric composition). In some aspects, and without wishing to be bound by theory, it is believed that at least a portion of the organic peroxide in the previously extruded second polymeric composition remains active in that it is capable of visbreaking the polymer in the first polymeric composition thereby reducing the average molecular weight of the polymer and increasing the melt flow rate of the first polymer composition. Non-limiting data in the Examples section confirms this discovery. Advantages of this discovery vis-à-vis currently existing organic peroxide master batches for melt flow rate modifiers include, but are not limited to: (1) pellet to pellet polypropylene blends can be extruded together without having to use other organic peroxide master batch melt flow rate modifiers (e.g., without having to use other liquid-based or solid-based peroxide master batch formulations); (2) the organic peroxide in the second extruded polypropylene composition, which may have previously been used to modify the melt flow rate of the second composition, can be re-used as a melt flow rate modifier in the first composition—use of the peroxide more than once as a melt flow rate modifier reduces the need to purchase or make additional peroxides, which can be beneficial from a cost perspective and/or from a societal perspective by limiting the need for producing additional peroxides; and/or (3) the second extruded polypropylene composition can safely be used as a peroxide master batch for the first composition given the presence of polypropylene—for example, while the melt flow rate of the first composition may be modified as desired, the other properties of the first composition can be retained due to the similarities between the first and second compositions.

These and other non-limiting aspects of the present invention are discussed in further detail in the following sections.

A. Polymeric Blend

Polymeric blend of the present invention can contain a first polypropylene composition and a second polypropylene composition. In some aspects, the polymeric blend can contain i) 75 wt. % to 99 wt. %, or equal to any one of, at least any one of, at most any one of, or between any two of 75, 76, 77, 78, 79, 80, 81, 82, 83, 84, 85, 86, 87, 88, 89, 90, 91, 92, 93, 94, 95, 96, 97, 98, and 99 wt. % of the first polypropylene composition, and ii) 1 wt. % to 25 wt. % or equal to any one of, at least any one of, at most any one of, or between any two of 1, 2, 3, 4, 5, 6, 7, 8, 9, 10, 11, 12, 13, 14, 15, 16, 17, 18, 19, 20, 21, 22, 23, 24, and 25 wt. % of the second polypropylene composition. In some aspects, the polymeric blend contains less than 0.5 wt. %, such as less than 0.3 wt. %, such as less than 0.1 wt. %, such as less than 0.05 wt. %, such as less than 0.01 wt. %, such as less than 0.001 wt. %, or essentially free of, or free of any other organic peroxide other than the organic peroxide present in the second polypropylene composition. In some aspects, the polymeric blend can have a MFR (e.g., C) of 5 g/10 min to 2000 g/10 min, or equal to any one of, at least any one of, at most any one of, or between any two of, 5, 6, 7, 8, 9, 10, 15, 20, 25, 30, 35, 40, 45, 50, 55, 60, 65, 70, 75, 80, 85, 90, 95, 100, 110, 120, 130, 140, 150, 200, 300, 400, 500, 600, 700, 800, 900, 1000, 1100, 1150, 1200, 1250, 1300, 1350, 1400, 1450, 1500, 1550, 1600, 1650, 1700, 1750, 1800, 1850, 1900, 1950, and 2000 g/10 min, measured in accordance with ASTM D1238 (230 °C/2.16 kg). In some non-limiting aspects, the MFR ratio of the polymeric blend to the first polypropylene composition can be 2 to 3, or 4 to 5.

1. Polypropylene

The polymers used in the polymer blend can include homopolymers (e.g., isotactic, syndiotactic, atactic polypropylene) of polypropylene, copolymers of propylene and other olefins, and terpolymers of propylene, ethylene, and/or dienes. In some instances, a controlled rheology grade polypropylene (CRPP) can be used. A CRPP is one that has been further processed (e.g., through a degradation process) to produce a polypropylene polymer with a targeted high melt flow index (MFI), lower molecular weight, and/or a narrower molecular weight distribution than the starting polypropylene.

Polypropylene can be prepared by any of the polymerization processes, which are in commercial use (e.g., a "high pressure" process, a slurry process, a solution process and/or a gas phase process) and with the use of any of the known catalysts (e.g., Ziegler Natta catalysts, chromium or Phillips catalysts, single site catalysts, metallocene catalysts, and the like). Polypropylene can be prepared using methods described in U.S. Pat. Nos. 8,957,159, 8,088,867, 8,071,687, 7,056,991 and 6,653,254. The polypropylene can also be purchased through a commercial source such as those from TotalEnergies (USA), Total SA, LyondellBassel Industries, Reliance Industries Ltd, Sinopec, and ExxonMobil Chemical Co. The polypropylene can be in previously extruded and/or be in solid form, for example, pellets.

2. First Polypropylene Composition

The first polypropylene composition can contain at least 95 wt. % polypropylene, such as 95 wt. % to 100 wt. %, or equal to any one of, at least any one of, at most any one of, or between any two of 95, 96, 97, 98, 99, 99.1, 99.2, 99.3, 99.4, 99.5, 99.6, 99.7, 99.8 and 99.9, 99.95 and 100 wt. % of the polypropylene based on the total weight of the first composition. In some aspects, the polypropylene in the first polypropylene composition can be a polypropylene homopolymer. In certain aspects, the first polypropylene composition can have, any one of, any combination of, or all of i) MFR of (e.g., A can be) of 0.5 g/10 min to 150 g/10 min, or equal to any one of, at least any one of, at most any one of, or between any two of 0.5, 1, 2, 3, 4, 5, 6, 7, 8, 9, 10, 15, 20, 25, 30, 35, 40, 45, 50, 55, 60, 65, 70, 75, 80, 85, 90, 95, 100, 110, 120, 130, 140, and 150 g/10 min, measured in accordance with ASTM D1238 (230 °C/2.16 kg), ii) a specific gravity or density of 0.85 g/cc to 0.95 g/cc, or equal to any one of, at least any one of, at most any one of, or between any two of 0.85, 0.86, 0.87, 0.88, 0.89, 0.9, 0.91, 0.92, 0.93, 0.94 and 0.95 g/cc as measured in accordance with ASTM D1505, and iii) a melting point of 140 °C to 180 °C, or equal to any one of, at least any one of, at most any one of, or between any two of 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, and 180 °C as measured using differential scanning calorimetry (DSC). In some aspects, the first polypropylene composition has been previously extruded prior to forming the blend.

A non-limiting example of a first polypropylene composition of the present invention includes Polypropylene 3860X, which is commercially available from Total Energies Petrochemicals & Refining USA, Inc. (Houston, Texas). Polypropylene 3860X is a polypropylene resin composition that includes homopolymer propylene and additives. Table 1 provides the characteristics of Polypropylene 3860X.

TABLE 1

| | Method | Unit | Typical Value |
|---|---|---|---|
| Rheological Properties | | | |
| Melt Flow | D-1238 | g/10 min | 100 |
| Mechanical Properties | | | |
| Tensile Modulus | D-638 | psi (MPa) | 240,000 (1,655) |
| Flexural Modulus | D-790 | Psi (MPa) | 229,000 (1,580) |
| Thermal Properties(1)(2) | | | |
| Melting Point | DSC | °F (°C) | 330 (165) |
| Other Physical Properties | | | |
| Density | D-1505 | g/cc | 0.905 |

(1)Data developed under laboratory conditions.
(2)MP determined with DSC-2 Differential Scanning Calorimeter.

Another non-limiting example of a first polypropylene composition of the present invention includes Polypropylene M3661, which is commercially available from Total Energies Petrochemicals & Refining USA, Inc. (Houston, Texas). Polypropylene M3661 is a polypropylene resin composition that includes metallocene homopolymer propylene and additives. It is an isotactic form of homopolymer polypropylene. Table 2 provides the characteristics of Polypropylene M3661.

TABLE 2

| | Method | Unit | Typical Value |
|---|---|---|---|
| Rheological Properties | | | |
| Melt Flow | D-1238 | g/10 min | 14 |
| Physical Properties(1) | | | |
| Tensile Strength @ Break | D-882, A | psi (MD/TD) | 5,800/5,500 |
| Elongation at Break | D-882, A | % (MD/TD) | 720/810 |
| 1% Secant Modulus | D-882, A | kpsi (MD/TD) | 81/82 |
| Haze | D-1003 | % | 0.4 |
| Gloss, 45° | D-2457 | — | 81 |
| Thermal Properties(2)(3) | | | |
| Melting Point | DSC | °F (°C) | 302 (150) |
| Other Physical Properties | | | |
| Density | D-1505 | g/cc | 0.9 |

(1)Non-oriented film - 2 mils (50 microns)
(2)Data developed under laboratory conditions.
(3)MP determined with DSC-2 Differential Scanning Calorimeter.

Yet another non-limiting example of a first polypropylene composition of the present invention includes Polypropylene M3766, which is commercially available from Total Energies Petrochemicals & Refining USA, Inc. (Houston, Texas). Polypropylene M3766 is a polypropylene resin composition that includes metallocene homopolymer propylene and additives. It is an isotactic form of homopolymer polypropylene. Table 3 provides the characteristics of Polypropylene M3766.

TABLE 3

| | Method | Unit | Typical Value |
|---|---|---|---|
| Rheological Properties | | | |
| Melt Flow | D-1238 | g/10 min | 24 |
| Mechanical Properties | | | |
| Tenacity | D-3218 | g/denier | 2.5 |
| Elongation | D-3218 | % | 185 |
| Thermal Properties(1)(2) | | | |
| Melting Point | DSC | °F (°C) | 304 (151) |
| Other Physical Properties | | | |
| Density | D-1505 | g/cc | 0.9 |

(1)Data developed under laboratory conditions.
(2)MP determined with DSC-2 Differential Scanning Calorimeter.

Still another non-limiting example of a first polypropylene composition of the present invention includes Polypropylene 3825, which is commercially available from Total Energies Petrochemicals & Refining USA, Inc. (Houston, Texas). Polypropylene 3825 is a polypropylene resin composition that includes homopolymer propylene and additives. Table 4 provides the characteristics of Polypropylene 3825.

TABLE 4

| | Method | Unit | Typical Value |
|---|---|---|---|
| Rheological Properties | | | |
| Melt Flow | D-1238 | g/10 min | 30 |
| Mechanical Properties | | | |
| Tensile @ Yield | D-638 | psi (MPa) | 4800 (35) |
| Elongation | D-638 | % | 12 |
| Tensile Modulus | D-638 | psi (MPa) | 210,000 (1,450) |

TABLE 4-continued

| | Method | Unit | Typical Value |
|---|---|---|---|
| Flexural Modulus | D-790 | psi (MPa) | 220,000 (1,515) |
| Izod Impact @ 73 °F | D-256A | ft.-lbs/in. (J/m) | |
| Notched | | | 0.4 (21) |
| Unotched | | | 16.0 (854) |
| Hardness | D-785A | Rockwell R | 104 |
| Thermal Properties[(1)(2)] | | | |
| Melting Point | DSC | °F (°C) | 330 (165) |
| Heat Deflection | D-648 | °F @ 66 psi | 250 |
| | | °C @, 4.64 kg/cm$^2$ | 121 |
| Other Physical Properties | | | |
| Density | D-1505 | g/cc | 0.905 |

[(1)]Data developed under laboratory conditions.
[(2)]MP determined with DSC-2 Differential Scanning Calorimeter.

A further non-limiting example of a first polypropylene composition of the present invention includes Polypropylene 3462, which is commercially available from Total Energies Petrochemicals & Refining USA, Inc. (Houston, Texas). Polypropylene 3462 is a polypropylene resin composition that includes homopolymer propylene and additives. Table 5 provides the characteristics of Polypropylene 3462.

TABLE 5

| | Method | Unit | Typical Value |
|---|---|---|---|
| Rheological Properties | | | |
| Melt Flow | D-1238 | g/10 min | 4.1 |
| Mechanical Properties) | | | |
| Tensile @ Yield | D-638 | psi (MPa) | 5,000 (35) |
| Elongation | D-638 | % | 12 |
| Tensile Modulus | D-638 | psi (MPa) | 220,000 (1,515) |
| Flexural Modulus | D-790 | psi (MPa) | 200,000 (1,380) |
| Izod Impact @ 73 °F | D-256A | ft.-lbs/in. (J/m) | |
| Notched | | | 0.6 (32) |
| Unotched | | | 17.0 (907) |
| Thermal Properties[(1)(2)] | | | |
| Melting Point | DSC | °F (°C) | 330 (165) |
| Heat Deflection | D-648 | ° F. @ 66 psi | 225 |
| | | ° C. @, 4.64 kg/cm$^2$ | 107 |
| Other Physical Properties | | | |
| Density | D-1505 | g/cc | 0.905 |
| Fiber Properties[(1)(3)] | | | |
| Tenacity | | g/denier | 5.8 |
| Elongation | | % | 28 |

[(1)]Data developed under laboratory conditions.
[(2)]MP determined with DSC-2 Differential Scanning Calorimeter.
[(3)]Samples processed at 6:1 draw ratio and 450 °F (232 °C) melt temperature.

3. Second Polypropylene Composition

The second polypropylene composition contains at least 99 wt. %, such as 99 wt. % to 99.95 wt. %, or equal to any one of, at least any one of, or between any two of 99, 99.1, 99.2, 99.3, 99.4, 99.5, 99.6, 99.7, 99.8 and 99.9, 99.91, 99.92, 99.93, 99.94 and 99.5 wt. % of the polypropylene and less than 1 wt. %, such as 0.05 wt. % to 1 wt. % %, or equal to any one of, at most any one of, or between any two of 0.05, 0.06, 0.07, 0.08, 0.09, 0.1, 0.2, 0.3, 0.4, 0.5, 0.6, 0.7, 0.8, 0.9 and 1 wt. % of the organic peroxide, based on the total weight of the second polypropylene composition.

In some aspects, the polypropylene in the second polypropylene composition can be a polypropylene homopolymer. In certain aspects, the second polypropylene composition have, any one of, any combination of, or all of i) MFR (e.g., B can be) of 500 g/10 min to 2000 g/10 min, preferable 1000 g/10 min to 1500 g/10 min, or more preferably 1250 g/10 min to 1350 g/10 min, or equal to any one of, at least any one of, at most any one of, or between any two of 500, 600, 700, 800, 900, 1000, 1050, 1100, 1150, 1200, 1250, 1260, 1270, 1280, 1290, 1300, 1310, 1320, 1330, 1340, 1350, 1400, 1450, 1500, 1550, 1600, 1650, 1700, 1750, 1800, 1850, 1900, 1950, and 2000 g/10 min, measured in accordance with ASTM D1238 (230 °C/2.16 kg), ii) a specific gravity or density of 0.85 g/cc to 0.95 g/cc, or equal to any one of, at least any one of, at most any one of, or between any two of 0.85, 0.86, 0.87, 0.88, 0.89, 0.9, 0.91, 0.92, 0.93, 0.94 and 0.95 g/cc as measured in accordance with ASTM D1505, and iii) a melting point of 160 °C to 170 °C, or equal to any one of, at least any one of, at most any one of, or between any two of 160, 161, 162, 163, 164, 165, 166, 167, 168, 169, and 170 °C as measured using differential scanning calorimetry (DSC). In some aspects, the second polypropylene composition has been previously extruded prior to forming the blend.

Examples of organic peroxides include 3,6,9-triethyl-3,6,9-trimethyl-1,4,7-triperoxonane; dicetyl peroxydicarbonate; 2,5-bis(tert-butylperoxy)-2,5-dimethyl-3-hexane; 2,5-dimethyl-2,5-bis-(t-butylperoxy)-hexyne; 3,4-methyl-4-t-butylperoxy-2-pentanone; 3,6,6,9,9-pentamethyl-3-(ethyl acetate)-1,2,4,5-textraoxy cyclononane; α,α'-bis-(tert-butylperoxy)diisopropyl benzene; 1,2,4,5,7,8-hexoxonane 3,6,9-trimethyl-3,6,9-tris(ethyl and propyl) derivatives, 3,6,6,9,9-pentamethyl-3-(ethyl acetate)-1,2,4,5-textraoxy cyclononane; di-2-ethylhexylperoxydicarbonate; 3,3-bis(2-methylbutan-2-ylperoxy)butanoate; 2,2-bis(t-butylperoxy) butane; 1,1,-bis(t-butylperoxy cyclohexane); n-butyl, 4,4-bis(t-butylperoxy valerate; 2,2-bis(4,4,-di-t-butylperoxy cyclohexyl) propane; t-butyl hydroperoxide; cumene hydroperoxide, dissopropylbenzene hydroperoxide; p-menthane hydroperoxide; 1,1,3,3-tetramethylbutyl hydroperoxide; t-butyl cumyl peroxide, di-t-butyl peroxide; dicumyl peroxide; isobutyryl peroxide; lauroyl peroxide; succinic peroxide; 3,5,5-trimethyl hexanoyl peroxide; di-2-ethoxyethylperoxy dicarbonate; diisopropyl peroxy carbonate; dimethoxybutylperoxy dicarbonate; butyl peroxy isopropyl monocarbonate; t-butyl peroxymaleic acid; t-butyl peroxy isobutyrate; t-butyl peroxyacetate; t-butylperoxy-2-ethylhexyl monocarbonate; t-butyl peroxy neodecanoate; t-butyl peroxy 2-ethylhexanote, t-butyl peroxypivalate; t-butyl peroxybenzoate; t-butyl peroxy 3,5,5,-trimethyl hexanoate; α,α'-bis(neodecanoyl peroxy)diisopropyl benzene; cumyl peroxyneodcanoate; 2,5-dimethyl-2,5-bis(m-toluoylperoxy) hexane; t-hexyl peroxy pivalate; 1,1,3,3-tetramethylbutyl peroxy neodecanoate; 1,1,3,3-tetramethylbutyl peroxy 2-ethylhexanoate; t-amyl peroxy pivalate; t-amyl peroxy 2-ethylhexanoate; t-amyl peroxy 2-ethylhexyl monocarbonate; t-amyl peroxy neodecanoate, and mixtures thereof. Commercially available organic peroxides are available from, for example, Arkema, Inc (France) under the Lupersol® tradename, AkzoNobel under the Trigonox® tradename, and Chemmex (China). In some particular aspects, the organic peroxide can be 3,6,9-triethyl-3,6,9-trimethyl-1,4,7-triperoxonane.

The second polypropylene composition can be obtained by adding to a polypropylene polymer an effective amount of organic peroxide to produce the second polypropylene composition. The organic peroxide can be added and processed in an amount and conditions that results in unreacted organic peroxide being present in the second polypropylene composition. The melt blending can be performed using known equipment (e.g., mixers, kneaders and extruders) and at a melt temperature of 160 °C to 180 °C, or equal to any one of, at most any one of, or between any two of 160 °C, 165 °C, 170 °C, 175 °C and 180 °C. In some embodiments, additional organic peroxide is added to the second polypropylene that contains a small amount of organic peroxide from previous processing. In some embodiments, the second polypropylene composition is obtained from a commercial source. In certain embodiments, the second polypropylene composition is used as a masterbatch. The second polypropylene composition is suitable to be used as a masterbatch. A non-limiting example of a second polypropylene composition of the present invention includes Polypropylene 3962, which is commercially available from Total Energies Petrochemicals & Refining USA, Inc. (Houston, Texas). Polypropylene 3962 includes about 99 wt. % homopolymer propylene, about 0.36 wt. % of 3,6,9-triethyl-3,6,9-trimethyl-1,4,7-triperoxonane, and other additives. Table 6 provides the characteristics of polypropylene 3962.

TABLE 6

| | Method | Unit | Typical Value |
|---|---|---|---|
| Rheological Properties | | | |
| Melt Flow | D-1238 | g/10 min | 1,300 |
| Thermal Properties[(1)(2)] | | | |
| Melting Point | DSC | °F (°C) | 330 (165) |
| Other Physical Properties | | | |
| Density | D-1505 | g/cc | 0.905 |
| Features | | | |
| Pelletized form | | | |
| Tertiary butyl alcohol (TBA) free | | | |
| Low Smoke and Odor | | | |

[(1)]Data developed under laboratory conditions.
[(2)]MP determined with DSC-2 Differential Scanning Calorimeter.

4. Optional Additives

The first and second polypropylene compositions of the present invention can include various additives. Non-limiting examples of additives include an antiblocking agent, an antistatic agent, an antioxidant, a neutralizing agent, a blowing agent, a crystallization aid, a dye, a flame retardant, a filler, an impact modifier, a mold release agent, an oil, another polymer, a pigment, a processing agent, a reinforcing agent, a nucleating agent, a clarifying agent, a slip agent, a flow modifier, a stabilizer, an UV resistance agent, and combinations thereof Additives are available from various commercial suppliers. Non-limiting examples of commercial additive suppliers include BASF (Germany), Dover Chemical Corporation (U.S.A.), AkzoNobel (The Netherlands), Sigma-Aldrich® (U.S.A.), Atofina Chemicals, Inc., and the like. The amount of optional additives can range from 0.01 wt. % to 5 wt. % (e.g., 0.01 wt. %, 0.05 wt. %, 0.1 wt. %, 0.2 wt. %, 0.3 wt. %, 0.4 wt. %, 0.5 wt. %, 0.6 wt. %, 0.7 wt. %, 0.8 wt. %, 0.9 wt. %, 1 wt. %, 1.5 wt. %, 2 wt. %, 2.5 wt. %, 3 wt. %, 3.5 wt. %, 4 wt. %, 4.5 wt. %, 5 wt. %, or any value or range there between) in the first polypropylene composition, the second polypropylene composition, or the polymeric blend.

B. Method of Making the Polymeric Blend

Polymeric blends of the present invention can be made by blending the first and second compositions together. In some aspects, the first and second polypropylene compositions can be in a solid form (e.g., pellets) and can be melted and mixed with the optional additives. Suitable blending machines are known to those skilled in the art. Non-limiting examples include mixers, kneaders and extruders. In certain aspects, the process can be carried out in an extruder by introducing the first polypropylene composition, the second polypropylene composition, and optional additives during processing. Non-limiting examples of an extruder includes single-screw extruders, contrarotating and co-rotating twin-screw extruders, planetary-gear extruders, ring extruders, or co-kneaders. The melt blending can be performed at a melt temperature of 160 °C to 260 °C, or equal to any one of, at most any one of, or between any two of 160 °C, 165 °C, 170 °C, 175 °C, 180 °C, 185 °C, 190 °C, 195 °C, 200 °C, 205 °C, 210 °C, 215 °C, 220 °C, 225 °C, 230 °C, 235 °C, 240 °C, 245 °C, and 250 °C. The first polypropylene composition and the second polypropylene composition can be subjected to an elevated temperature for a sufficient period of time during blending. The blending temperature can be above the softening point of the polypropylene compositions. The amounts of first polypropylene composition to second polypropylene composition can be adjusted as long as the weight ratio of first polypropylene composition to the second polypropylene composition is greater than 5:1 up to 99:1. The first polypropylene composition to the second polypropylene composition can be at least, equal to, or between any two of 5:1, 10:1, 15:1, 20:1, 30:1, 40:1, 50:1, 60:1, 70:1, 80:1, 90:1, and 99:1.

Additives can be premixed or added individually to the polymer blend or the first polypropylene composition or the second polypropylene composition. By way of example, the additives can be premixed such that they are added to the polymer blend, first polypropylene composition, or the second polypropylene composition. Incorporation of additives into the polymer blend can be carried out, for example, by mixing the above-described components using methods customary in process technology. The blending temperature can be above the softening point of the polymers. In certain aspects, a process can be performed at a temperature from about 160 °C to 250 °C. Such "melt mixing" or "melt compounding" results in uniform dispersion of the present additives in the polymer blend, the first polypropylene composition, the second polypropylene composition or a combination thereof.

C. Fibers Containing the Polymeric Blend

The polymeric blends of the present invention can be used to make fibers and fiber bundles and non-woven materials. In some aspects, the fibers can be contained in a fully oriented yarn (FOY). In some aspects, the fibers can be contained in a partially oriented yarn (POY).

A FOY of the present invention can be drawn at a draw ratio of 1.5:1 to 4.5:1 or equal to any one of, at least any one of, at most any one of, or between any two of 1.5:1, 2:1, 2.5:1, 3:1, 3.5:1, 4:1 and 4.5:1. In certain aspects, the FOY can have any one of, any combination of, or all of i) a denier, 150 to 450 or equal to any one of, at least any one of, or between any two of 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, and 450, ii) a maximum tenacity of 1.5 to 4.5 or equal to any one of, at least any one of, or between any two of 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, and 4.5, and iii) a maximum elongation of 50% to 300%, or equal to any one of, at least any one of, or between any two of 50, 60, 70, 80, 90, 100, 110, 120, 130, 140, 150, 160, 170, 180, 190, 200, 210, 220, 230, 240, 250, 260, 270, 280, 290 and 300%.

In some aspect, the FOY can be drawn at a draw ratio of 2:1, and can have a denier of 300 and 400, a maximum tenacity of 2 to 4.5, and/or a maximum elongation of 150% to 250%. In some aspect, the FOY can be drawn at a draw ratio of 3:1, and can have a denier of 300 and 400, a maximum tenacity of 2 to 4.5, and/or a maximum elongation of 50% to 150%. In some aspect, the FOY at a 3.5:1 draw ratio, can have a denier of 300 and 400, a maximum tenacity of 2.5 to 4.5, and/or a maximum elongation of 50% to 150%.

A POY of the present invention can be spun at a spinning rate of 1500 m/min to 5000 m/min, or equal to any one of, at least any one of, at most any one of, or between any two of 1500, 2000, 2500, 3000, 3500, 4000, 4500 and 5000 m/min. In certain aspects, the POY can have any one of, any combination of, or all of i) a denier, 50 to 450 or equal to any one of, at least any one of, or between any two of 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, and 450, ii) a maximum tenacity of 1.5 to 4.5 or equal to any one of, at least any one of, or between any two of 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, and 4.5, and iii) a maximum elongation of 50% to 300%, or equal to any one of, at least any one of, or between any two of 50, 60, 70, 80, 90, 100, 110, 120, 130, 140, 150, 160, 170, 180, 190, 200, 210, 220, 230, 240, 260, 270, 280, 290, and 300%. In some aspects, the POY can be spun at a spinning rate of 4000 m/min, has a denier of 50 to 200, a maximum tenacity of 1.5 to 3, and a maximum elongation of 100% to 300%. In some aspects, the POY can be spun at a spinning rate of 2000 m/min, has a denier of 100 to 250, a maximum tenacity of 1.5 to 3, and a maximum elongation of 150% to 350%. In some aspects, the POY can be spun at a spinning rate of 4200 m/min, has a denier of 50 to 200, a maximum tenacity of 1.5 to 3, and a maximum elongation of 50% to 300%.

The fibers of the present application can be produced by commonly known production methods, such as for example described in Polypropylene Handbook, ed. Nello Pasquini, 2nd edition, Hanser, 2005, pages 397-403 or in F. Fourne, Synthetische Fasern, Carl Hanser Verlag, 1995, chapter 5.2 or in B. C. Goswami et al., Textile Yarns, John Wiley & Sons, 1977, p. 371-376. Generally, fibers are produced by melting a polymer or a polymer composition in an extruder, optionally passing the molten polymer through a melt pump to ensure a constant feeding rate and then extruding the molten polymer or molten polymer composition through a number of fine capillaries of a spinneret to form fibers. These still molten fibers are simultaneously cooled by air and drawn to a final diameter and are finally collected. Optionally, the so-obtained fibers may be subjected to a further drawing step. In some aspects, the fiber forming process can include any one of, any combination of, or all of i) melting the polymeric blend at a melt temperature of 200 °C to 260 °C, or equal to any one of, at most any one of, or between any two of 200 °C, 205 °C, 210 °C, 215 °C, 220 °C, 225 °C, 230 °C, 235 °C, 240 °C, 245 °C, 250 °C, 255 °C, and 260 °C to form a melted composition, ii) extruding the melted composition through a spinneret to form an extruded fiber filament, and iii) drawing the extruded fiber filament. In some aspects, the melted polymer blend can be extruded through the spinneret at a speed of 1500 m/min to 5000 m/min, or equal to any one of, at least any one of, at most any one of, or between any two of 1500, 2000, 2500, 3000, 3500, 4000, 4500 and 5000 m/min. In some aspects, the draw ratio of the drawing process can be 1.5:1 to 4.5:1, or equal to any one of, at least any one of, at most any one of, or between any two of 1.5:1, 2:1, 2.5:1, 3:1, 3.5:1, 4:1 and 4.5:1.

D. Articles Containing the Polymeric Blend

The polymeric blends of the present invention can be included in an article of manufacture. In some aspects, the article of manufacture can be an extruded, a blow-molded, rotational-molded, an injection-molded, and/or thermoformed article. In some aspects, the article of manufacture can be transparent. Non-limiting examples of articles of manufacture can include, films, sheets, fibers, yarns, a packing filing, a forming film, a protective packaging, a shrink sleeve, and/or label, a shrink film, a twist wrap, a sealant film, a cap, a crate, a bottle, a jar, a funnel, a pipette tip, a well plate, a microtiter plate, a syringe, a suture, a face mask, personal protective equipment, a medical tool, a medical tray, a sample vial, a cuvette, a reaction vial, contact lens mold, a cigarette filter, a technical filter, woven socks, cold and warm weather sport clothing, undergarments, shoes, ropes, twines, bale warp, tape, construction/industrial fabrics, piping, non-electric fuses for initiating explosives, absorbent products (e.g., diapers), expandable foams, carpets, mats, rugs, furniture, toys, luggage, tote bags, duffle bags, sport bags backpacks, fabrics, food containers and lid, deli containers and lids, dairy containers and lids, vehicle parts, dashboards, bumpers, cladding, exterior trim, film cushioning, film skins, covers, interior vehicle elements. In these and other uses the resins may be combined with other materials, such as particulate materials, including talc, calcium carbonate, wood, and fibers, such as glass or graphite fibers, to form composite materials. Examples of such composite materials include components for furniture, automotive components and building materials, particularly those used as lumber replacement.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

A. Example 1 (Visbreaking with a Second Polymeric Composition of the Present Invention)

FIG. 1 is a graphical illustration of two approaches for vis-breaking a first polymeric composition of the present invention. In one approach, which is a non-limiting embodiment of the present invention, a first melt blend was created by blending Total Polypropylene 3860X (see above Table 1, which is a non-limiting example of a first composition of the present invention) with Total Polypropylene 3962 (see above Table 6, which is a non-limiting example of a second composition of the present invention). As explained above, Total Polypropylene 3962 includes about 99 wt. % homopolymer propylene and about 0.36 wt. % of 3,6,9-triethyl-3,6,9-trimethyl-1,4,7-triperoxonane (Triganox 301®). Total Polypropylene 3860X is a previously extruded composition. This first melt blend was created by a pellet to pellet dry blend that was extruded on a single screw extruder to produce pellets. The concentration of Triganox 301 was calculated to be increasing as follows 0.072, 0.108, 0.144, 0.18, 0.216, 0.252, 0.288, 0.32 wt. %.

In a second approach, which is a comparative example to the first melt blend, a second comparative melt blend was created by directly blending 3,6,9-triethyl-3,6,9-trimethyl-1,4,7-triperoxonane (Triganox 301®) with Total Polypropylene 3860X. This second comparative melt blend was created by blending polypropylene fluff with peroxide and extruded on a single screw extruder to produce pellets. The concentration of peroxide was increasing as follows 0.25, 0.27, 0.29, 0.32, 0.365 wt. %.

As illustrated in FIG. 1, the first melt blend had similar MFR values with the second comparative melt blend. These MFR data confirm that a previously extruded second polypropylene composition of the present invention can itself be used as melt flow rate modifier for a first polypropylene composition of the present invention.

B. Example 2 (Polymeric Blend Containing a Polypropylene Having a MFR of about 14 g/10 Min)

Figure 2:
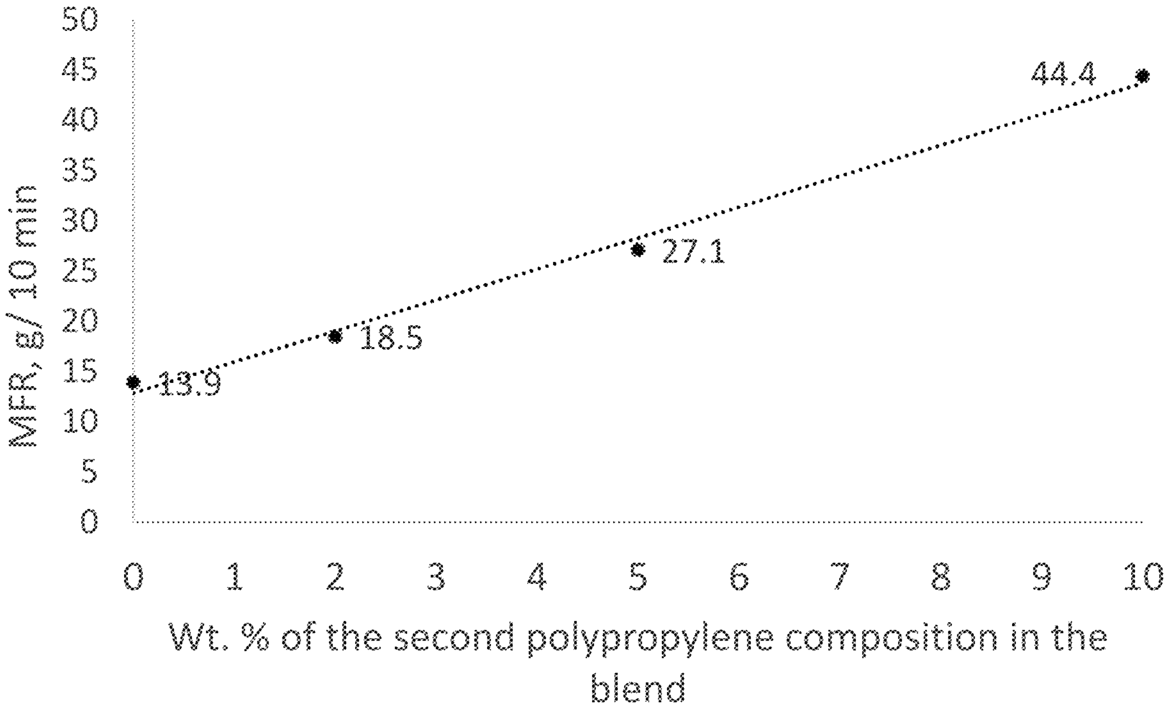
FIG. 2 is a graphical representation of melt flow rate (MFR) of blends containing a first polypropylene composition having a MFR of about 14 g/10 min, and a second polypropylene composition having a MFR of 1300 g/10 min.

Polymeric blends containing a first polypropylene composition the Total Polypropylene 3962 as the second polypropylene composition were made. The first polypropylene composition contained a polypropylene having a MFR of 13.9 g/10 min, measured in accordance with ASTM D1238 (230 °C/2.16 kg), density of 0.905 g/cc, as measured in accordance with ASTM D1505, and a melting point of 152 °C, as measured using differential scanning calorimetry (DSC). The first polypropylene composition is Total Polypropylene M3661 (see above Table 2). Three (3) polymeric blends having 2 wt. %, 5 wt. %, and 10 wt. % the second polypropylene composition with the balance being the first polypropylene composition (e.g., 98 wt. %, 95 wt. %, and 90 wt. %, respectively) were made. The change in MFR versus weight percent of second polypropylene composition in the blend are illustrated graphically in FIG. 2. As shown, using various amounts of the second polypropylene the MFR of the first polypropylene composition was tuned to produce new polypropylene compositions with desired MFR values.

C. Example 3 (Polymeric Blend Containing a Polypropylene Having a MFR of about 25 g/10 Min)

Figure 3:
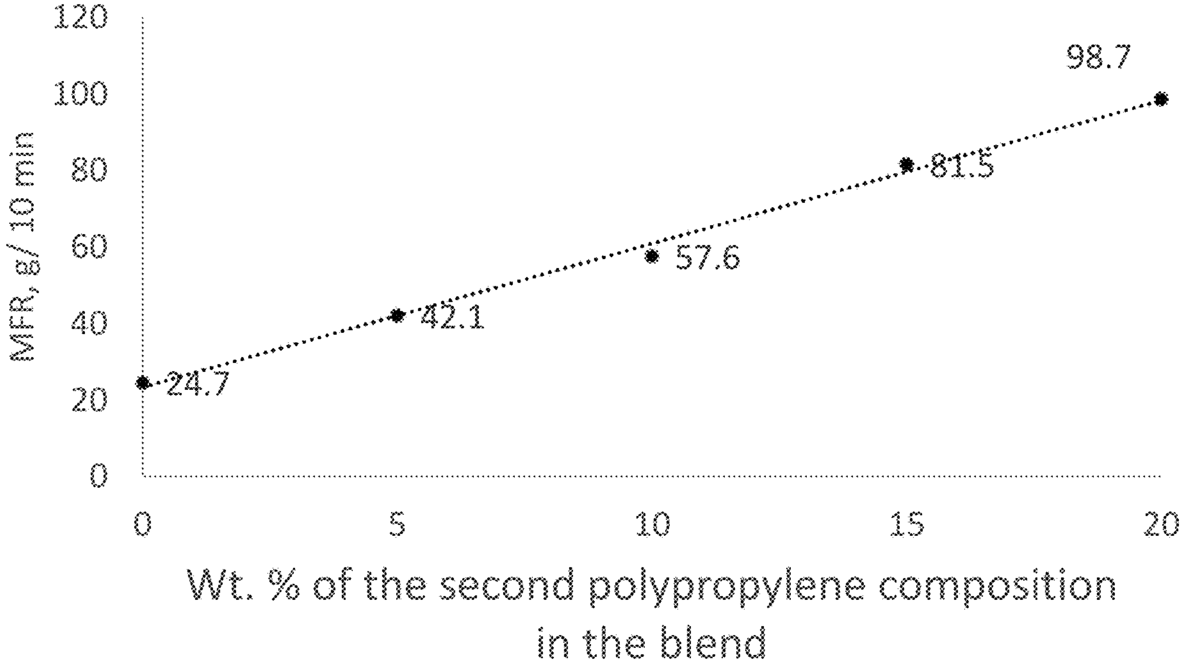
FIG. 3 is a graphical representation of melt flow rate (MFR) of a blends containing a first polypropylene composition having a MFR of about 24.7 g/10 min, and a second polypropylene composition having a MFR of 1300 g/10 min.

Polymeric blends containing a first polypropylene composition and the Total Polypropylene 3962 as the second polypropylene composition were made. The first polypropylene composition contained a polypropylene having a MFR of 24.7 g/10 min, measured in accordance with ASTM D1238 (230 °C/2.16 kg), density of 0.90 g/cc, as measured in accordance with ASTM D1505, and a melting point of 151 °C, as measured using differential scanning calorimetry (DSC). The first polypropylene composition is Total Polypropylene M3766 (see above Table 3). Four (4) polymeric blends having 2 wt. %, 5 wt. %, 10 wt. %, and 20 wt. % the second polypropylene composition with the balance being the first polypropylene composition (e.g., 98 wt. %, 95 wt. %, 90 wt. %, and 80 wt. % respectively). The change in MFR versus percent of second polypropylene composition in the blend are illustrated graphically in FIG. 3. As shown, using various amounts of the second polypropylene masterbatch the MFR of the first polypropylene composition was tuned to produce new polypropylene compositions with desired MFR values.

D. Example 4 (Polymeric Blend Containing a Polypropylene Having a MFR of about 30 g/10 Min, and the Second Polypropylene Composition)

Figure 4:
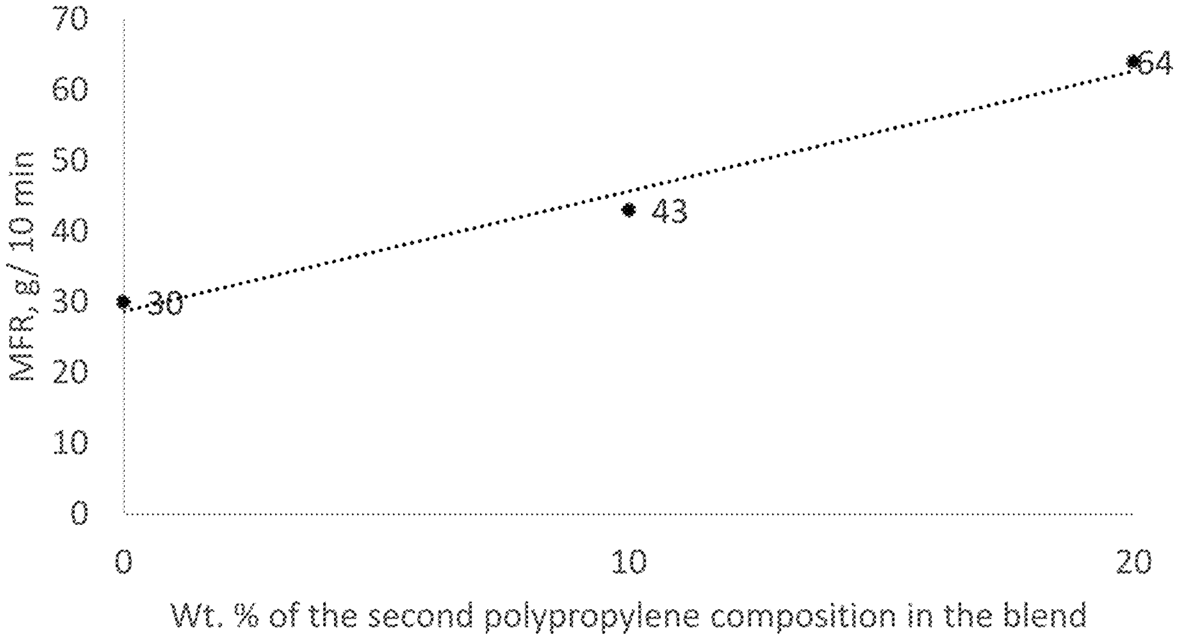
FIG. 4 is a graphical representation of melt flow rate (MFR) of a blends containing a first polypropylene composition having a MFR of about 30 g/10 min, and a second polypropylene composition having a MFR of 1300 g/10 min.

Polymeric blends containing a first polypropylene composition and the Total Polypropylene 3962 as the second polypropylene composition were made. The first polypropylene composition contained a polypropylene having a MFR of 30 g/10 min, measured in accordance with ASTM D1238 (230 °C/2.16 kg), density of 0.905 g/cc, as measured in accordance with ASTM D1505, and a melting point of 165 °C, as measured using differential scanning calorimetry (DSC). The first polypropylene composition is Total Polypropylene 3825 (see above Table 4). Two (2) polymeric blends having 10 wt. %, and 20 wt. % the second polypropylene composition with the balance being the first polypropylene composition (e.g., 90 wt. % and 80 respectively) were made. The change in MFR versus percent of second polymer in the blend are illustrated graphically in FIG. 4. As shown, using various amounts of the second polypropylene masterbatch the MFR of the first polypropylene composition was tuned to produce new polypropylene compositions with desired MFR values.

E. Example 5 (Fibers Containing Polypropylene)

Polymers blends were created having a first polypropylene composition and the Total Polypropylene 3962 as the second polypropylene. The first polypropylene composition contained a polypropylene having a MFR of 4.2 g/10 min, measured in accordance with ASTM D1238 (230 °C/2.16 kg), density of 0.905 g/cc, as measured in accordance with ASTM D1505, and a melting point of 165 °C, as measured using differential scanning calorimetry (DSC). The first polypropylene composition is Total Polypropylene 3462 (see above Table 5). The first polypropylene composition had been re-extruded. Blend A had 5 wt. % of the Example 2 second polypropylene composition and 95 wt. % of the re-extruded first polypropylene composition. Blend B had 10 wt. % of the second polypropylene composition and 90 wt. % of the re-extruded first polypropylene composition. Fully oriented yarn (FOY) and partially oriented yarn (POY) were made. The melt temperature of the fiber line for forming the fibers in Tables 7 and 8 was 230 °C. Properties of the FOY different draw ratios are listed in Table 7 and properties of the POY at different spin rates are listed in Table 8. From the data, it can be concluded that the blends of the present invention can be used to make fully oriented yarns and partially oriented yarns that are comparable to yarns made using homopolymers produced through a Ziegler Natta process.

TABLE 7

| | First polypropylene composition | Blends A | Blend B |
|---|---|---|---|
| MFR g/10 min | 4.2 | 10.4 | 18.5 |
| | FOY-2:1 draw ratio | | |
| Denier | unable to aspirate | 332 | 354 |
| Tenacity, maximum | | 2.82 | 2.08 |
| % Elongation, maximum | | 183 | 198 |
| | FOY-3:1 draw ratio | | |
| Denier | | 345 | Fiber too loose to stay on godets |
| Tenacity, maximum | | 3.16 | |
| % Elongation, maximum | | 98 | |

TABLE 7-continued

| | First polypropylene composition | Blends A | Blend B |
|---|---|---|---|
| FOY-3.5:1 draw ratio | | | |
| Denier | | 332 | |
| Tenacity, maximum | | 2.82 | |
| % Elongation, maximum | | 183 | |

TABLE 8

| | First polypropylene composition | Blend A | Blend B |
|---|---|---|---|
| MFR g/10 min | 4.2 | 10.4 | 18.5 |
| Maximum Spinnability | Not spinnable | 2000 | 4200 |
| POY-2000 meter/min | | | |
| Denier | not achieved | 1599 | |
| Tenacity, maximum | not achieved | 2.34 | |
| % Elongation, maximum | not achieved | 251 | |
| POY-4000 meter/min | | | |
| Denier | not achieved | not achieved | 130 |
| Tenacity, maximum | not achieved | not achieved | 2.15 |
| % Elongation, maximum | not achieved | not achieved | 170 |
| POY-4200 meter/min | | | |
| Denier | not achieved | not achieved | 106 |
| Tenacity, maximum | not achieved | not achieved | 2.4 |
| % Elongation, maximum | not achieved | not achieved | 146 |

As can be seen from Table 7, the blends of the present invention can be processed at standard temperatures and yield resulting in relatively good FOY properties. As can be seen from Table 8, blending the second polymeric composition allows for very high spin rate.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein can be utilized. Accordingly, the appended claims are intended to include within their scope such processes, machines, manufacture, compositions of matter, means, methods, or steps.

The invention claimed is:

1. A polymeric blend comprising:

75 wt. % to 99 wt. % of a first polypropylene composition comprising polypropylene and having a melt flow rate (MFR) of A g/10 min as measured by ASTM D1238 (230 °C/2.16 kg), wherein the first polypropylene composition has been previously extruded prior to forming the blend; and 1 wt. % to 25 wt. % of a second polypropylene composition comprising polypropylene and an organic peroxide and having a MFR of B g/10 min as measured by ASTM D1238 (230 °C/2.16 kg), wherein the second polypropylene composition has been previously extruded prior to forming the blend, wherein the polymeric blend has a MFR of C g/10 min as measured by ASTM D1238 (230 °C/2.16 kg), wherein C is greater than A, and wherein MFR B is 500 to 2000 g/10 min and the second polypropylene composition further comprises:

a specific gravity of density of 0.89 g/cc to 0.92 g/cc as measured in accordance with ASTM D1505; and a melting point of 145 °C to 175 °C as measured using differential scanning calorimetry (DSC).

2. The polymeric blend of claim 1, wherein the polymeric blend does not include any other organic peroxide other than the organic peroxide present in the second polypropylene composition.

3. The polymeric blend of claim 1, wherein the polypropylene in the second polypropylene composition is a polypropylene homopolymer, random copolymer, or an impact copolymer, or any combination thereof.

4. The polymeric blend of claim 1, wherein the second polypropylene composition comprises at least 99 wt. % of the polypropylene and less than 1 wt. % of the organic peroxide, based on the total weight of the second polypropylene composition.

5. The polymeric blend of claim 1, wherein the organic peroxide is 3,6,9-triethyl-3,6,9-trimethyl-1,4,7-triperoxonane.

6. The polymeric blend of claim 1, wherein MFR A is 0.5 g/10 min to 150 g/10 min.

7. The polymeric blend of claim 1, wherein the first polymeric composition comprises 90 to 95 wt. % polypropylene based on the total weight of the first composition.

8. The polymeric blend of claim 1, wherein the polypropylene in the first polypropylene composition is a polypropylene homopolymer.

9. The polymeric blend of claim 8, wherein the first polypropylene composition comprises:

a specific gravity of density of about 0.905 g/cc as measured in accordance with ASTM D1505;

a melting point of about 165 °C as measured using differential scanning calorimetry (DSC); and a MFR A of about 4.1 g/10 min as measured by ASTM D1238 (230 °C/2.16 kg).

10. The polymeric blend of claim 1, wherein the blend comprises 94 wt. % to 96 wt. % of the first polypropylene composition and 4 wt. % to 6 wt. % of the second polypropylene composition, based on the total weight of the blend, and wherein the MFR ratio of C:A is 2 to 3.

11. The polymeric blend of claim 10, wherein A is 3 to 5 g/10 min and Cis 8 to 12 g/10 min.

12. The polymeric blend of claim 1, wherein the blend comprises 89 wt. % to 91 wt. % of the first polypropylene composition and 9 wt. % to 11 wt. % of the second polypropylene composition, based on the total weight of the blend, and wherein the MFR ratio of C:A is 4 to 5.

13. The polymeric blend of claim 12, wherein A is 3 to 5 g/10 min and Cis 16 to 20 g/10 min.

14. The polymeric blend of claim 1, wherein the first polypropylene composition comprises:

a specific gravity of density of 0.89 g/cc to 0.92 g/cc as measured in accordance with ASTM D1505;

a melting point of 145 °C to 160 °C as measured using differential scanning calorimetry (DSC); and a MFR A of 10 to 20 g/10 min as measured as measured by ASTM D1238 (230 °C/2.16 kg).

15. The polymeric blend of claim 1, wherein the first polypropylene composition comprises:

a specific gravity of density of 0.89 g/cc to 0.92 g/cc as measured in accordance with ASTM D1505;

a melting point of 145 °C to 160 °C as measured using differential scanning calorimetry (DSC); and a MFR A of 20 to 30 g/10 min as measured by ASTM D1238 (230 °C/2.16 kg).

16. The polymeric blend of claim 1, wherein the first polypropylene composition comprises:

a specific gravity of density of 0.89 g/cc to 0.92 g/cc as measured in accordance with ASTM D1505;

a melting point of 160 °C to 170 °C as measured using differential scanning calorimetry (DSC); and a MFR A of 25 to 35 g/10 min as measured by ASTM D1238 (230 °C/2.16 kg).

17. The polymeric blend of claim 1, wherein the first polypropylene composition comprises:

a specific gravity of density of 0.89 g/cc to 0.92 g/cc as measured in accordance with ASTM D1505;

a melting point of 160 °C to 170 °C as measured using differential scanning calorimetry (DSC); and a MFR A of 90 to 110 g/10 min as measured by ASTM D1238 (230 °C/2.16 kg).

18. The polymeric blend of claim 1, wherein the blend is in the form of a fiber.

19. A polymeric blend in the form of a fiber, the polymeric blend comprising:

75 wt. % to 99 wt. % of a first polypropylene composition comprising polypropylene and having a melt flow rate (MFR) of A g/10 min as measured by ASTM D1238 (230 °C/2.16 kg), wherein the first polypropylene composition has been previously extruded prior to forming the blend; and 1 wt. % to 25 wt. % of a second polypropylene composition comprising polypropylene and an organic peroxide and having a MFR of B g/10 min as measured by ASTM D1238 (230 °C/2.16 kg), wherein the second polypropylene composition has been previously extruded prior to forming the blend, wherein the polymeric blend has a MFR of C g/10 min as measured by ASTM D1238 (230 °C/2.16 kg), wherein C is greater than A, and wherein a plurality of the fibers are comprised in a fully oriented yarn (FOY), wherein the FOY, at a 2:1 draw ratio, has a denier of 300 and 400, a maximum tenacity of 2 to 3, and a maximum elongation of 150 to 250.

20. A polymeric blend in the form of a fiber, the polymeric blend comprising:

75 wt. % to 99 wt. % of a first polypropylene composition comprising polypropylene and having a melt flow rate (MFR) of A g/10 min as measured by ASTM D1238 (230 °C/2.16 kg), wherein the first polypropylene composition has been previously extruded prior to forming the blend; and 1 wt. % to 25 wt. % of a second polypropylene composition comprising polypropylene and an organic peroxide and having a MFR of B g/10 min as measured by ASTM D1238 (230 °C/2.16 kg), wherein the second polypropylene composition has been previously extruded prior to forming the blend, wherein the polymeric blend has a MFR of C g/10 min as measured by ASTM D1238 (230 °C/2.16 kg), wherein C is greater than A, and wherein a plurality of the fibers are comprised in a partially oriented yarn (POY), wherein the POY, at a spinning rate of 4000 m/min, has a denier of 100 to 150, a maximum tenacity of 1.85 to 2.50, and a maximum elongation of 150 to 200.

21. An article of manufacture comprising the polymeric blend of claim 1.

22. The article of manufacture of claim 21, wherein the article of manufacture is an extruded, blow-molded, injection-molded, rotational molded, compression molded, 3-D printed, or thermoformed composition.

23. A method for making a fiber comprising the polymeric blend of claim 1, the method comprising:

blending the second polypropylene composition with the first polypropylene composition to form the polymeric blend; and forming a fiber from the polymeric blend.

24. The method of claim 23, wherein forming the fiber comprises:

melting the polymeric blend at a melt temperature of 250 °C or below to form a melted composition;

extruding the melted composition through a spinneret to form an extruded fiber filament; and drawing the extruded fiber filament.

25. The method of claim 24, wherein the melted composition is extruded through the spinneret at a speed of 1500 meter/min to 4500 meter/min.

26. The method of claim 24, wherein the draw ratio of the drawing process is 1.5:1 to 4.5:1.

27. A method for increasing melt flow rate (MFR) of a first polypropylene composition comprising a polypropylene, the method comprising:

blending the first polypropylene polymeric composition with a second polypropylene composition comprising polypropylene and an organic peroxide to form a polymeric blend, wherein the second polypropylene composition has been previously extruded prior to forming the blend, and wherein the polymeric blend comprises:

75 wt. % to 99 wt. % of the first polypropylene composition comprising polypropylene and having a melt flow rate (MFR) of A g/10 min as measured by ASTM D1238 (230 °C/2.16 kg), wherein the first polypropylene composition has been previously extruded prior to forming the blend; and 1 wt. % to 25 wt. % of a second polypropylene composition comprising polypropylene and an organic peroxide and having a MFR of B g/10 min as measured by ASTM D1238 (230 °C/2.16 kg), wherein the polymeric blend has a MFR of C g/10 min as measured by ASTM D1238 (230 °C/2.16 kg), wherein C is greater than A, and wherein MFR B is 500 to 2000 g/10 min and the second polypropylene composition further comprises:

a specific gravity of density of 0.89 g/cc to 0.92 g/cc as measured in accordance with ASTM D1505; and a melting point of 145 °C to 175 °C as measured using differential scanning calorimetry (DSC).

28. The method of claim 27, wherein the polymeric blend does not include any other organic peroxide other than the organic peroxide present in the second polypropylene composition.

29. The method of claim 27, wherein the polypropylene in the second polypropylene composition is a polypropylene homopolymer.

* * * * *